United States Patent
Gelter et al.

(10) Patent No.: US 9,553,713 B2
(45) Date of Patent: Jan. 24, 2017

(54) METHOD AND SYSTEM FOR TRANSMITTING CLOCK REFERENCE STREAMS WITH TIMESTAMPS DIRECTLY TO AUDIO/VIDEO END NODES IN AN AUDIO/VIDEO BRIDGING NETWORK

(71) Applicant: Harman International Industries, Inc., Stamford, CT (US)

(72) Inventors: Aaron Gelter, West Jordan, UT (US); Dave Olsen, Kaysville, UT (US)

(73) Assignee: Harman International Industries, Inc., Stamford, CT (US)

( * ) Notice: Subject to any disclaimer, the term of this patent is extended or adjusted under 35 U.S.C. 154(b) by 219 days.

(21) Appl. No.: 14/266,490

(22) Filed: Apr. 30, 2014

(65) Prior Publication Data

US 2015/0318977 A1 Nov. 5, 2015

(51) Int. Cl.
*G06F 1/00* (2006.01)
*G06F 1/04* (2006.01)
*G06F 1/12* (2006.01)
*G06F 15/16* (2006.01)
*H04L 7/00* (2006.01)
*H04L 29/06* (2006.01)
*H04N 21/2381* (2011.01)
(Continued)

(52) U.S. Cl.
CPC ........... *H04L 7/0012* (2013.01); *H04L 65/607* (2013.01); *H04N 21/2381* (2013.01); *H04N 21/242* (2013.01); *H04N 21/4381* (2013.01)

(58) Field of Classification Search
CPC . H04L 7/0012; H04L 65/607; H04N 21/2381; H04N 21/4381; H04N 21/242

USPC ......................................................... 713/375
See application file for complete search history.

(56) References Cited

U.S. PATENT DOCUMENTS 8,478,856 B2 7/2013 Williams et al.
8,599,310 B2 12/2013 Carter
(Continued)

FOREIGN PATENT DOCUMENTS

EP 2515501 A1 10/2012

OTHER PUBLICATIONS

"11 Clock Reference Streams (CRS); P1722a_CRS_08062013", IEEE Draft; P1722a_CRS_08062013, IEEE-SA, Piscataway, NJ USA, vol. 1722, Aug. 6, 2013 (Aug. 6, 2013), pp. 1-13 XP068059389.*

(Continued)

*Primary Examiner* — Robert Cassity
(74) *Attorney, Agent, or Firm* — Brooks Kushman P.C.

(57) ABSTRACT

An apparatus used to communicate with a plurality of audio/video (A/V) end nodes in an Audio Video Bridging (AVB) network. The apparatus may include a first A/V end node. The first A/V end node may be configured to transmit a clock reference stream including a plurality of timestamps to a plurality of A/V end nodes. The plurality of A/V end nodes may transmit a media stream including a plurality of video samples and a plurality of audio samples to one another. The media stream may be separate from the plurality of timestamps. The plurality of A/V end nodes may be arranged to syntonize or synchronize the plurality of video samples and the plurality of audio samples with one another for playback in response to the plurality of timestamps.

23 Claims, 6 Drawing Sheets

(51) Int. Cl.
*H04N 21/242* (2011.01)
*H04N 21/438* (2011.01)

(56) References Cited

U.S. PATENT DOCUMENTS

| | | | |
|---|---|---|---|
| 2012/0263263 A1* | 10/2012 | Olsen | H04L 67/16 |
| | | | 375/354 |
| 2012/0327300 A1* | 12/2012 | Hutchings | H04N 21/4307 |
| | | | 348/515 |
| 2013/0003757 A1 | 1/2013 | Boatright et al. | |
| 2013/0268692 A1 | 10/2013 | Williams et al. | |
| 2014/0093085 A1* | 4/2014 | Jarvis | H04R 27/00 |
| | | | 381/17 |
| 2014/0118473 A1* | 5/2014 | Halavy | H04N 7/152 |
| | | | 348/14.09 |
| 2015/0128174 A1* | 5/2015 | Rango | H04N 21/21805 |
| | | | 725/34 |

OTHER PUBLICATIONS

Extended European Search Report for foreign counterpart application EP 15163479.7, dated Sep. 14, 2015, 12 pages.
"11 Clock Reference Streams (CRS); P1722A_CRS_08062013", IEEE Standards Draft, vol. 1722, retrieved Aug. 6, 2013, pp. 72-84.
Silfvast, Rob, "1722A Global System Clock Streams (aka Media Clock Streams) Principles and Suggestions", IEEE Standards Draft, retrieved Apr. 15, 2013, vol. 1722, 6 pages.
"Conclusions from April F2F; 1722a_agelter_clock_reference_stream_labels_v1", IEEE Standards Draft, retrieved May 6, 2013, vol. 1722, No. v1, 4 pages.
Weibel, Hans, et al., "Media Clock Synchronization Based on PTP", AES 44th International Conference: Audio Networking, San Diego, CA, USA, Nov. 18, 2011, pp. 1-8.

* cited by examiner

| Value — 208 | Type — 206 |
|---|---|
| $0_{16}$ | Null (Placeholder) — 210 |
| $1_{16}$ | Audio Sample Timestamp — 212 |
| $2_{16}$ | Video Frame Sync Timestamp — 214 |
| $3_{16}$ | Video Line Sync Timestamp — 216 |
| $4_{16}$ | Audio Metadata — 218 |
| $5_{16}$ | SMPTE Time Code — 220 |
| $6_{16}$ | SMPTE Sample Code — 222 |
| $7\text{-}FE_{16}$ | Reserved — 224 |
| $FF_{16}$ | Vendor Specific — 226 |

METHOD AND SYSTEM FOR TRANSMITTING CLOCK REFERENCE STREAMS WITH TIMESTAMPS DIRECTLY TO AUDIO/VIDEO END NODES IN AN AUDIO/VIDEO BRIDGING NETWORK

TECHNICAL FIELD

The present disclosure generally relates to time reference management in audio and video systems.

BACKGROUND

The supplying of clock information in an Audio Video Bridging (AVB) network is based on the recovery of a clock from presentation timestamps that are received in a media stream. Real time transporting of digital audio and video and other digital media over data networks creates a new set of problems compared to non-media data. For instance, data networks may use packet switching in which data is divided into packets for separate transmission. As the packets are transmitted, sequential packets may take different routes and include different transit times. The packets are numbered to ensure they can be reordered correctly after arrival. This technique, however, does not suffice when left and right audio signals are to be received at different destinations, for instance at different speakers.

Unlike non-media data, digital media must be played out in synchronization. For example, video and audio must be aligned in time so that when they are played out the images match the sound.

The concept of a network clock has been used to address timing problems in data networks. A network clock signal is typically generated at a specific point in the network and this becomes a system time signal received by devices on the network. The system time signal is then used as a time reference for every device that receives the system time signal. Because of the topology of the network, devices at different locations on the network will receive the clock signal with a phase offset from the network clock, depending on the propagation delay from the clock to the device. A further consequence is that different remote devices may include received clock signals that include phase offsets with respect to each other, as well as with respect to the network clock.

Digital media transmission has historically embedded clocking information in the transmitted data. Embedding and recovering clocking information from data signal transitions or packet timing (e.g., Audio Engineering Society standard AES3, Sony/Philips Digital Interface, Gibson Media-accelerated Global Information Carrier) works well for point to point links between a small number of devices, but as the number of devices increases, clock jitter cascades and builds through each device that recovers and re-transmits the clocking information.

Digital media transmissions may alternatively employ a Time Division Multiplexing (TDM) approach. In TDM systems (e.g. Multichannel Audio Digital Interface, CobraNet), a master clock device initiates periodic transmission cycles and each device is allocated one or more time slots within that cycle for transmission. This limits the total available number of channels.

SUMMARY

In at least one embodiment, an apparatus for communicating with a plurality of audio/video (A/V) end nodes in an Audio Video Bridging (AVB) network. The apparatus includes a first A/V end node. The first A/V end node may be configured to transmit a clock reference stream including a plurality of timestamps to a plurality of A/V end nodes. The plurality of A/V end nodes may transmit a media stream including a plurality of video samples and a plurality of audio samples to one another. The media stream may be separate from the plurality of timestamps. The plurality of A/V end nodes may be arranged to synchronize the plurality of video samples and the plurality of audio samples with one another for playback in response to the plurality of timestamps.

In at least one embodiment, a computer-program product embodied in a non-transitory computer readable medium that is programmed for communicating with a plurality of A/V end nodes in an AVB network. The computer-program product comprises instructions to transmit a clock reference stream including a plurality of timestamps to a plurality of A/V end nodes. The computer-program product further comprises the plurality of A/V end nodes to transmit a media stream to one another. The media stream including a plurality of video samples and a plurality of audio samples. The media stream being separate from the plurality of timestamps. The plurality of A/V end nodes being arranged to synchronize the plurality of video samples and the plurality of audio samples with one another for playback in response to the plurality of timestamps.

In at least one embodiment, an apparatus for communicating with a plurality of A/V end nodes in an AVB network. The apparatus comprises a plurality of first A/V end nodes. The A/V end nodes may each include a first input to receive a media stream and a second input to receive a clock reference stream. The media stream may include a plurality of video samples and a plurality of audio samples. The clock reference stream may include a plurality of timestamps from a second A/V end node. The plurality of first end nodes may be configured to synchronize the plurality of video samples and the plurality of audio samples with one another for playback in response to the plurality of timestamps.

DETAILED DESCRIPTION

Figure 1A:
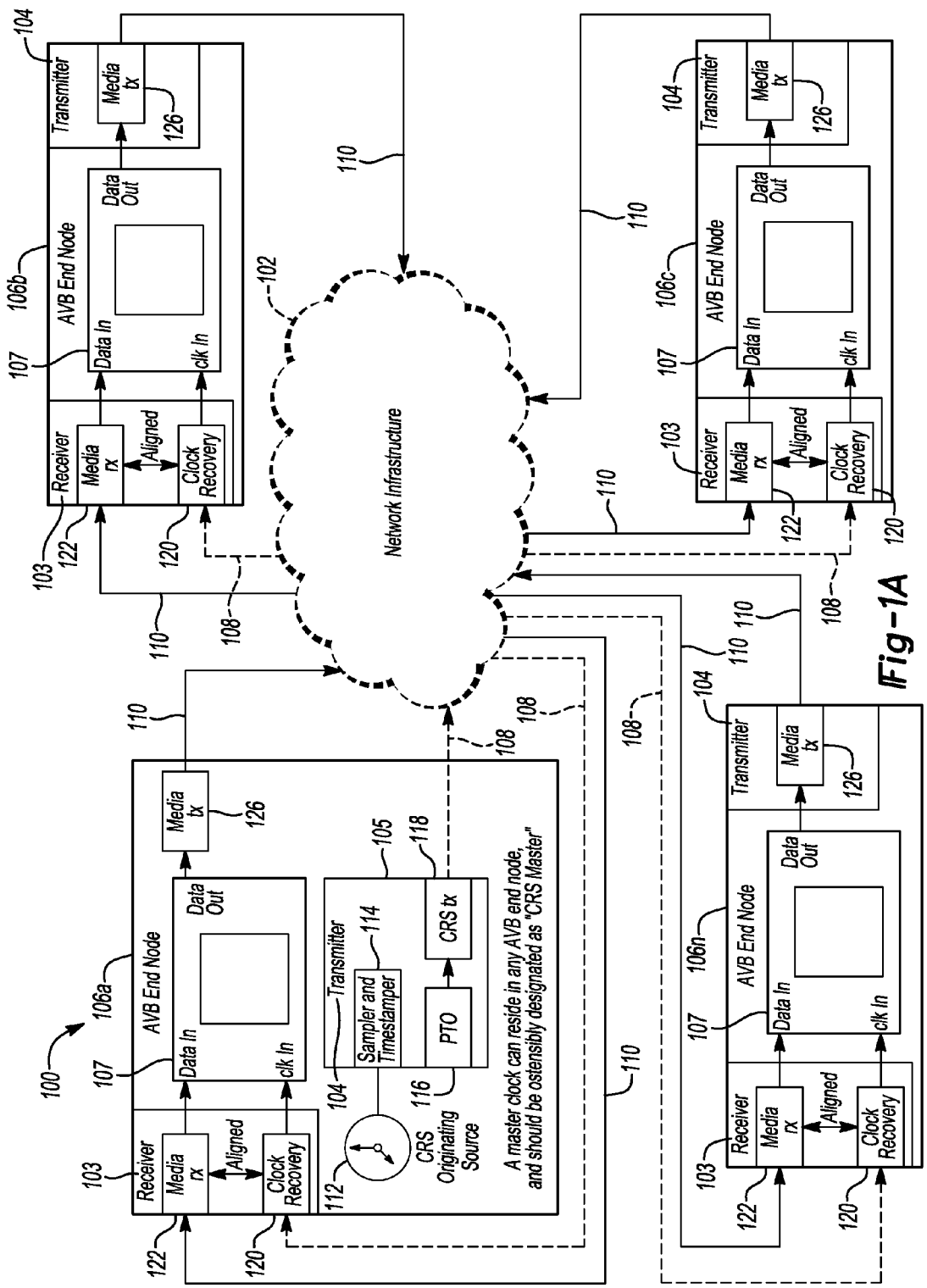
FIG. 1A depicts a block topology of an Audio Video Bridging (AVB) network comprising a clock reference stream distribution system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A clock signal is a particular type of signal that oscillates between a high and a low state to coordinate actions of one or more audio and/or video devices (herein known as one or more audio/video devices). The one or more audio/video devices using the clock signal for synchronization may become active at either the rising edge, falling edge, or both in the rising and in the falling edges of the clock cycle. The one or more audio/video devices may transmit and receive the clock signal to coordinate actions with each other in an Audio Video Bridging (AVB) network. The AVB network may comprise a clock distribution network that includes a master clock to generate a system time signal. The system time signal coordinates the one or more audio/video devices to send and receive media packets over the network.

The clock distribution network may synchronize the flow of data signals among synchronous data paths. The design of these networks can affect system-wide performance and reliability. For example, a digital logic circuit board may be designed to optimize performance by comprising each storage element (i.e., flip-flop) clocked at the same instant. To accomplish this aspect, a design requires careful physical distribution of the clock signal from a single point of origin to multiple destinations. The clock distribution may include conductors on each audio device on a circuit board or inside of an integrated circuit comprising the same lengths such that the clock distribution provides equal propagation delays. The clock distribution design may be done manually by a board layout designer creating equal length traces between pins on an integrated circuit, or in the case of a field-programmable gate array (FPGA) integrated circuit or similar, may allow certain clock signals to be routed differently through the circuit to guarantee that signals may arrive at the input to a flip-flog within a specific timing window. However, if the clock signals arriving at the various flip-flops were to include random or unknown phase relationships, it may be difficult to guarantee that data being received at the input port of a given flip-flop may not be changing at the time that the flip-flop's clock arrives, and therefore the behavior of the system may be unpredictable.

In the AVB network, it is desirable to maintain timing relationships between different audio/video devices for the same reasons it may be necessary in the digital logic circuit. The AVB network may supply clocking information using a general Precision Time Protocol (gPTP) by recovering a clock from a time-aware end station. For example, the gPTP system frequently includes the time-aware end station to create an underlying time base that all devices use to tell time. The time-aware end station may include an audio/video device with a single network connection and is either the source (e.g., Talker) of or destination (e.g., Listener) for a synchronization reference, or a combination thereof. The gPTP system is achieved through the exchange of messages across the communication medium of the network. For example, the gPTP system may transmit its own messages of various types to sync the time bases of all devices (i.e., one or more time-aware end stations) to within a defined threshold as defined in the Institute of Electrical and Electronics Engineers (IEEE) Standard 802.1AS-2011. After all the audio/video devices include a synchronized time base (i.e., gPTP is locked), then media streams can be transported.

Typical media stream logic reads the current gPTP time when an audio or video sample is taken and may add an offset to create a presentation time or add the time at which the sample shall be presented to the playback device on the Listener. After the media stream logic decides to add an offset or add the time at which the sample shall be presented to the playback device, the media stream logic may then place the time in the media stream packet. The Talker and Listener are on the same time base because of the gPTP system, therefore these presentation timestamps may be used to determine the exact frequency and phase of the Talker's media clock. The Listener may adjust its clock to match the exact frequency and phase of the Talker's media clock based on the timestamps. The timing information is typically transmitted with media data, which may not be optimal because the system may require the reception of media data at a high frequency rate (e.g., 8 kHz), which may be excessive for recovering a media clock. Also, the gPTP system communicates the clocking information directly to a media stream creation logic at the high frequency rate which may cause additional work for a processor to retrieve the timing information.

The AVB network may include a clock reference stream for transmitting timing information separate from the media stream. The clock reference stream enables the AVB network to transmit the timing information at a lower frequency rate with minimal bandwidth usage. Alternatively, the Talker may send a large amount of timestamps per second initially to help the Listener lock its media clock to the Talker quickly, after which the Talker may back off and may only send a small number of timestamps per second, or enough to keep the Listener's clock locked with minimal drift. The clock reference stream may allow for the dissemination of clock timing information to one or more audio/video devices on the AVB network. The clock reference stream may be configured to include a packet format which allows for different types of media clocks, as well as other clock related content, to be disseminated across a network. The format may be configured for use in an AVB network application, but may be also applicable in other packet based mechanisms including, but not limited to, Real-Time Transport Protocol, Dante protocol, and/or CobraNet protocol.

The clock reference stream may be used for transmitting clocking information about a single clock; alternatively, they may be used for more complex scenarios, such as correlating different types of clocks, transmitting information about multiple clocks from a single master device, or for supplying Society of Motion Pictures and Television (SMPTE) time code or sample count information. The clock reference stream may contain no media data and does not need to be sent at the same rate as Audio Video Transport Protocol (AVTP) stream data. A system and method to provide a mechanism for supplying media clock timing information with minimal bandwidth usage and supporting all audio and video clocks while eliminating null data during the clock timing transmission is described herein. The clock reference streams on an AVB network may be realized as discussed below.

FIG. 1 depicts a block topology of an AVB network 100 comprising a clock reference stream distribution system according to an embodiment. The AVB network 100 includes one or more audio/video (A/V) devices herein known as one or more A/V end nodes 106a-106n (or "106"). The one or more A/V end nodes 106 may be similar to one another or may be different. For example, the one or more A/V end nodes 106 may include, but is not limited to, a microphone, speaker, video player, amplifier, and/or a combination thereof. Each of the one or more A/V end nodes 106 may include at least one of a receiver 103, a transmitter 104, a circuit 107 (e.g., controller) that may perform an internal media function, and/or a combination thereof.

The AVB network 100 may include a network infrastructure 102. The AVB network infrastructure 102 may include, but is not limited to, physical wiring and intermediate AVB capable bridges. The AVB capable bridges may connect the A/V end nodes 106.

The A/V end nodes 106 may operate within a single, common media clock domain. The AVB network 100 may assign an A/V end node 106a as the media clock master device 105. In another embodiment, the AVB network 100 may assign a non-media Talker (not shown) that transmits no media data as the media clock master device 105. The media clock master device 105 (i.e., a clock reference stream master) provides the single point of origin for media clock timing, and this timing information is delivered to the A/V end nodes 106 which operate in that clock domain via an AVTP stream.

The AVB network 100 may select the A/V end node 106a as the media clock master device 105 (i.e., the Talker) using the controller 107 at the A/V end node 106a. In one embodiment, the A/V end nodes 106 may be assigned as the media clock master device 105 by the controller 107 and/or statically assigned by the AVB network 100. In another embodiment, the A/V end node device 106a may transmit a request to the AVB network 100 to be assigned the media clock master device 105.

For example, the AVB network 100 may be preconfigured to assign which A/V end node 106 is the Talker (i.e., A/V end node 106a). In another example, a standalone control module (not shown) in the network 100 may determine which A/V end node 106 is assigned the Talker 106a.

The media clock master device 105 may include a transmitter 104 for sending a clock reference stream 108 reserving bandwidth per a Stream Reservation Protocol (SRP). The SRP reservations (i.e. the reservation of bandwidth for the stream) are created separately from the logic that actually transmits the packet. The reservation may be created either by the controller 107 at the one or more A/V end nodes 106 or the Talker 106a itself before stream transmission begins. The Talker 106a may comprise transmission logic (not shown) executed on hardware within the transmitter 104, the transmission logic may receive the designated clock reference stream from a clock reference stream originating source 112.

The media clock master device 105 may include the clock reference stream originating source 112 generating a range of transmission rates sent to the transmission logic executed on hardware at the Talker 106a. The transmission logic may include a sampler and timestamper device 114. The sampler and timestamper device 114 may be capable of detecting media clock edges and assigning a gPTP timestamp to these edges. The Talker 106a may add a presentation time offset (PTO) 116. The PTO 116 is an offset added to the sampled timestamps to account for the maximum network latency along the path from the Talker 106a to a Listener (i.e., A/V end node 106b, 106c, and 106n). The AVB network 100 uses destination timestamps, which means that the timestamps designate the time at which a sample is to be played at the A/V end nodes 106 designated as the Listener 106b-106n. These timestamps are created by taking the timestamp of the sampler and timestamper 114 and adding the PTO (e.g., a constant offset). The PTO must be large enough to provide enough time for the sample to be transported across the AVB network 100 and saved at the Listener 106b-106n prior to the samples being played. For example, an Ethernet system may include a PTO of 2 ms, however the value may be decreased for latency optimizations. For the media clock master device 105, the clock reference stream originating source 112 generates a clock that provides a clocking source for the stream on that clock domain. At each clock edge (or a constantly spaced subset of clock edges) the current gPTP time is sampled by the sampler and timestamper 114, the PTO 116 is added, and then the resultant timestamp is placed in a packet of one or more timestamps. The media clock master device 105 may transmit 118 the one or more timestamps in the clock reference stream 108 to the one or more A/V end nodes 106 in the AVB network 100.

For example, the media clock master device 105 may be chosen for a given clock domain by at least one of the controllers 107 of the A/V end nodes 106, the standalone control module and/or static assignment by the AVB network 100. The AVB network may recognize any one of the A/V end nodes 106 as the media clock master device 105. The static assignment may include an A/V end node 106 comprising hard-coded logic to request a designation as the Talker 106a for transmitting the clock reference stream 108. During static assignment, the A/V end nodes 106 in the AVB network 100 that are designated as the Listener 106b-106n may not comprise the hard-coded logic to request the designation as the Talker 106a. The controller 107 may assign the A/V end nodes 106 as the Talker 106a or the Listener 106b-106n. The Talker 106a may include a designated media clock master device 105 transmitting no media data. The selection of the Talker 106a either by the controller 107 and/or static assignment may determine the rate at which clock reference stream protocol data units (PDUs) may be transmitted by the media clock master device 105. The clock reference stream 108 may be transmitted at a lower rate than the AVTP PDUs. In one example, the clock reference stream 108 may be transmitted on the order of hundreds of clock reference PDUs per second depending on the requirements of the system. The recovery requirements of the system may require the clock reference stream rate to be higher or lower than that of an AVB media stream.

The one or more A/V end nodes 106 may receive the designated stream and synchronize their media clock with the clock reference stream 108. The one or more A/V end nodes 106 may include the receiver 103 comprising a media receiver 122 and a clock recovery circuit 120. The receiver 103 may utilize and update the clock reference stream 108 by detecting a non-continuous change in a sequence number of the timestamps (i.e., packets). The sequence number may increments by one for each packet and rolls over to zero when the maximum value of the sequence number is exceeded. The initial value of the sequence number is random. The sequence number is used to detect lost packets, for example if the packet is assigned sequence number forty-five, and is followed by a packet with sequence number forty-seven, then packet forty-six may be assumed missing. The receiver 103 may determine that a dropped clock reference stream PDU is detected based on the change in sequence numbers. If one or more dropped clock reference stream PDUs are detected, the receiver 103 may adjust a calculation as needed to account for the missing data. For example, the static packet transmitted from the clock reference stream source (i.e., the media clock master device 105) is received by the clock recovery circuit 120 of the A/V end nodes 106 designated as the Listener 106b-106n. The Listener 106b-106n may receive the timestamps included in the clock reference stream 108 and recover the clock in both frequency and phase. For example, two frequency synchronized clocks may include the same rate but rising and falling edges may not be aligned. The clock reference stream 108 provides information to the end nodes 106 to phase and frequency match a derived clock.

The clock recovery circuit 120 may include recovery logic (not shown) to detect missing packets based on the sequence numbers. For example, if subsequent timestamps are taken every eight sample periods, then the recovery logic executed at the clock recovery circuit 120 may safely assume that the last timestamp of packet A and the first timestamp of packet B are also eight sample periods apart in time. However, if there is a jump in the sequence number, then the logic determines that an assumption about spacing cannot be made. The recovery logic may not calculate the time difference between the last sample of packet A and the first sample of packet B and may continue on as normal from there.

The one or more A/V end nodes 106 may receive a clock reference stream 108 at the clock recovery circuit 120 and a media stream 110 at the media receiver 122. The media stream 110 is a series of network frames that contain audio or video data. The A/V end nodes 106 may align the packet data from the media stream 110 with the timestamps from the clock recovery circuit 120. The timestamps in the media stream 110 indicate at which time the associated samples are to be executed (i.e., played) at the Listener 106b-106n. In one implementation, the samples are placed into a circular buffer at an offset that may result in the samples being read out of the buffer at the correct time. The media clock recovery circuit 120 is configured to adjust the frequency and phase of the clock so that the circuit may read the samples out of the circular buffer such that it matches the rate that the samples are being placed in the buffer (in other words so that it matches the rate at which the Talker 106a is sampling the data). When the media clocks are locked, the data is being placed into the buffer at the same rate as it is being pulled out and there are no buffer underruns or overruns. The media receiver 122 and the clock recovery circuit 120 may transmit the media stream 110 and clock reference stream 108 to the controller 107 for internal media function. The internal media function is logic executed on the controller 107 to place incoming media stream samples into the circular buffer and outputs the media steam samples at the correct time. The internal media function executed on the controller 107 may output the samples to the "playback device". For a speaker, the playback device would be the digital-to-analog converter (DAC) used to convert the samples to actual sound. For a mixing desk, the playback device might not be actual audio, but rather the input stage to digital signal processing (DSP) which combines several samples in various ways. The controller 107 may output data to a transmitter 104 comprising a media transmission device 126 for transmitting media data on the AVB network 100.

For example, a speaker may be designated as a Listener 106b-106n on the AVB network 100, therefore the speaker may only include the receiver 103 and the controller 107 but not the transmitter 104. In another example, a microphone may comprise the receiver 103 with only the clock recovery circuit 120 (not the media receiver 122) and the transmitter 104. An A/V end node 106 such as a mixing desk or matrix processor may include both transmitter 104 and receiver 103 components.

The A/V end nodes 106 may be capable of accurately locking to a media clock from the media clock master device 105. For example, the one or more A/V end nodes 106 may lock to the clock reference stream 108 within an acceptable amount of time while receiving as few as 100 timestamps per second. In another example, an A/V end node 106 may be able to lock in well under a second when receiving 8,000 packets per second.

The AVTP may support the existence of multiple, independent, media clock master devices 105 on the same AVB network 100, and may not require fixed, ratio-metric timing relationships to the gPTP network clock. For example, any A/V end node 106 (i.e., device), including a non-media Talker, communicating in the AVB network 100 may be assigned as the Talker. Instead, the gPTP clock may be used as a "measuring stick" to establish timing coordinates between the one or more A/V end nodes 106. If the gPTP clock undergoes a slight frequency shift (for example, due to a grandmaster clock changeover) the frequency of media clocks distributed by the clock reference stream methods may not undergo a corresponding shift. The grandmaster clock device with the gPTP system is used as a reference clock for the clock reference stream 108. The measuring stick may include scaled (expanded or contracted) slightly, but since the one or more A/V end nodes 106 agree on the same new measuring stick after the grandmaster change, the one or more A/V end nodes 106 may effectively communicate timing coordinates in the same way prior to the grandmaster clock change. The media clock periods may measure slightly longer or shorter than before. Based on this method, it is entirely possible to distribute, for example, a 1 ppm media clock, with good long-term stability, on a network including 50 ppm gPTP clocks that occasionally undergo changes of the grandmaster.

Figure 1B:
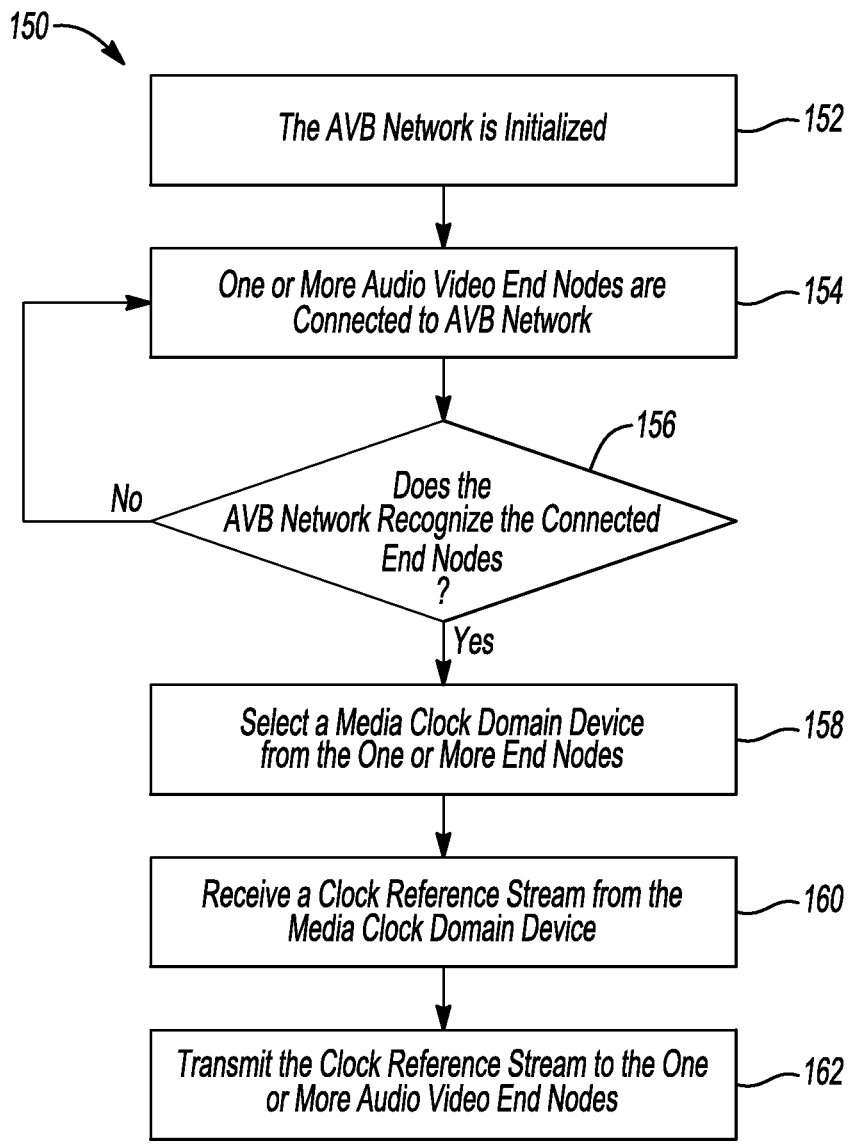
FIG. 1B depicts a flow chart of an AVB network assigning a Talker to transmit the clock reference stream.

FIG. 1B depicts a flow chart of the AVB network 100 comprising the A/V end node 106a using the controller 107 to request being assigned the Talker (i.e., media clock master device 105). The Talker 106a may transmit the clock reference stream 108. Although the various operations shown in the flowchart diagram 150 appear to occur in a chronological sequence, at least some of the operations may occur in a different order, and some operations may be performed concurrently or not at all.

In operation 152, the controller 107 may initialize the A/V end nodes 106 in communication on the network once a power-on request is received.

In operation 154, the AVB network 100 may receive a message from the one or more A/V end nodes 106 requesting to communicate on the AVB network 100.

In operation 156, the AVB network 100 may recognize the A/V end nodes 106 requesting to communicate on the network 100. The A/V end node 106 may be preconfigured as the Talker 106a and begin to transmit a clock reference stream to the one or more A/V end nodes 106 in operation 160. In one example, a device (not assigned as an A/V end node 106) in communication with the AVB network may be configured to allow an operator to select an A/V end node 106a-106n as the Talker, therefore assigning the Talker 106a as the media clock master device 105.

In operation 162, once selected, the media clock master device 105 may transmit the clock reference stream 108 to the one or more A/V end nodes 106. The clock reference stream 108 is independent of any media data on the media stream 110 used by the A/V end node 106. The one or more A/V end nodes 106 may receive the clock reference stream 108 to synchronize the media data on the media stream 110 with the other A/V end nodes 106a-106n in communication on the network 100.

Figures 2A, 2B:
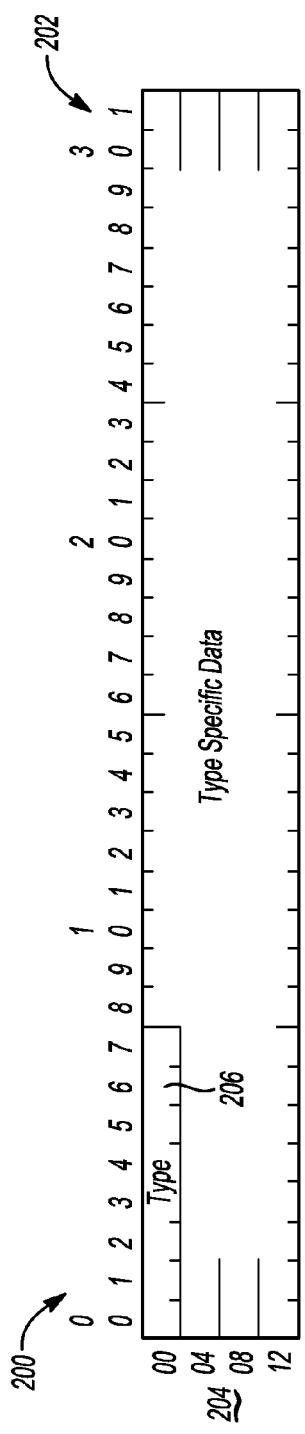
FIG. 2A-2B depict a packet format of a timestamp for the clock reference stream in the AVB network according to an embodiment.

FIG. 2A-2B depict a packet format 200 of the timestamp for the clock reference stream 108 in the AVB network 100 according to an embodiment. The clock reference stream 108 allows for one or more clocks to be described within one stream. Therefore, one or more clock types may exist in the clock reference stream 108, which may be useful for describing related clocks. For example, the one or more clock types in the clock reference stream 108 may include, but is not limited to, an audio sample timestamp 212, a video framesync timestamp 214, video line sync timestamp 216, and/or audio metadata 218. The timing information for the multiple clocks may be packed into one packet format 200; therefore the task of correlating and aligning the clocks may be simplified. The packet format 200 may also include, but is not limited to, standardized timestamp information, vendor specific 226, SMPTE time codes 220, and/or SMPTE sample code 222. There are most likely several other timing formats/types that may be used with the packet format of timestamps for the clock reference stream 108, however they are not explicitly enumerated in this embodiment.

In one embodiment, the audio sample timestamp 212 may be used to convey the sampling time of an audio sample clock. The video frame sync timestamp 214 may be used to convey the start of frame time of a video signal and/or the edge time of a frame sync clock. The video line sync timestamp 216 may be used to convey the start of line time of a video signal and/or the edge time of a line sync clock. The audio metadata 218 may be used to convey audio timing information usually embedded within a video transmission. The SMPTE time code 220 is formatted to convey television time code data per SMPTE standard ST 12-1:2008. The SMPTE sample code 222 may be used for keeping a sample count of video or audio data.

FIG. 2A depicts the packet format 200 for the clock reference stream 108 in the AVB network 100 which may include a top designator 202 and a side designator 204 to help a reader easily ascertain field widths and offsets. The packet format 200 may comprise one or more entry fields in the clock reference stream 108. The number of entry and order of the fields in the packet format 200 may remain constant for the life of the stream 108. The layout of the packet format 200 may include a reference type 206 field to enable the AVB network 100 to recognize the data type since one or more clocks may be described within one clock reference stream 108.

FIG. 2B depicts one or more references types that may be available for each entry on the clock reference stream 108. The reference type 206 may indicate the type of timestamp represented by the clock reference stream PDU including one or more timestamp entries and the format of the clock reference stream payload. For example, the clock reference stream 108 may include a timestamp entry with a reference type 206 of Null 210. The Null 210 reference type 206 may be used when one or more of the entry fields do not include valid data at any given time for that timestamp on the clock reference stream 108. The Null 210 reference type 206 may take the place of the entry to indicate that no new information is present for that timestamp on the clock reference stream 108. The Null 210 reference type 206 may include a type field value 208 of $0_{16}$ which equates to a defined level of protocol.

The type field value 208 associated with the reference type 206 may define the type field entry to a designate value. For example, a type field value 208 of $2_{16}$ is placed in the reference type 206 field as an entry to designate that it is the video frame sync timestamp 214.

Figure 3:
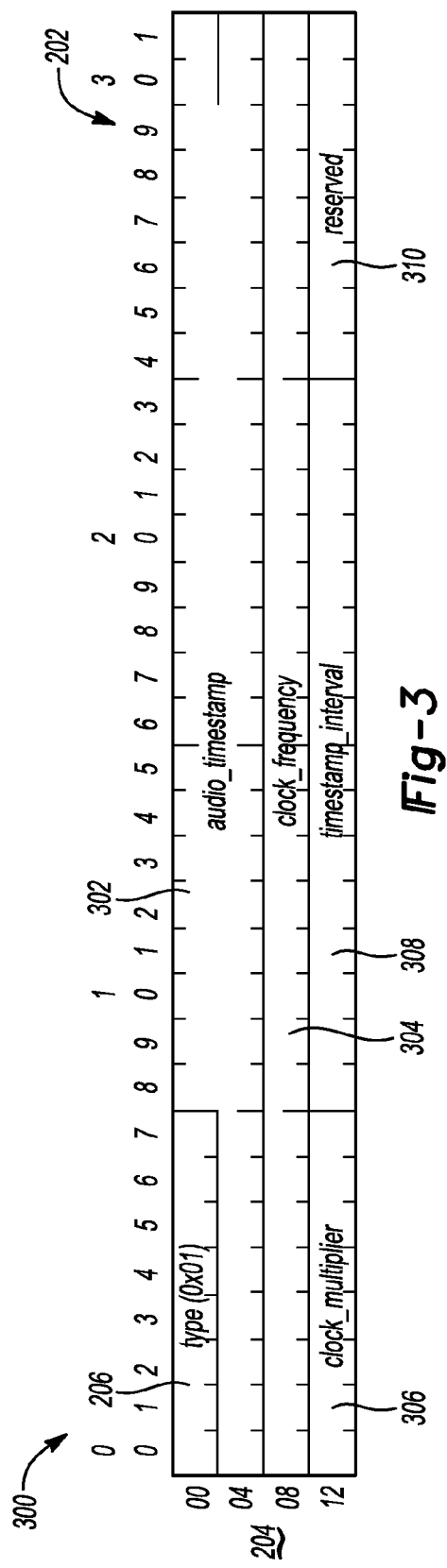
FIG. 3 depicts a timestamp diagram of an audio sample clock format for the clock reference stream in the AVB network according to an embodiment.

FIG. 3 depicts a timestamp diagram of an audio sample clock format 300 for the clock reference stream 108 in the AVB network 100 according to an embodiment. The reference type 206 may indicate that the timestamp is the audio sample timestamp 212 comprising the audio sample clock format 300. The audio sample clock format 300 may include a type field value 208 of $1_{16}$ which is defined in the reference type 206 of an entry of a timestamp.

The clock reference stream 108 may include a 64 bit timestamp in units of nanoseconds and including a maximum value of $2^{64}-1$ ns. The clock reference stream 108 including the 64 bit timestamp is given by the following equation:

$$\text{timestamp}=(AS_{sec}\times 10^9+AS_{ns})\text{module}2^{64} \qquad (1)$$

wherein $AS_{sec}$ is the PTP seconds field, and $AS_{ns}$ is the PTP nanoseconds field.

The clock reference stream 108 enables one or more timestamps to be supplied by the source of the media clock (i.e., media clock master device 105) to allow media clock slaves (i.e., one or more A/V end nodes 106 assigned as Listeners) to lock quickly to the media clock by processing all timestamps within the clock reference stream PDU. Once the A/V end node 106 assigned as the Listener 106b-106n (i.e., slave) is locked to the remote media clock (i.e., media clock master device 105), the end node 106 may continue to process all timestamps in the received clock reference stream 108, or the A/V end nodes 106 may process only a subset of the timestamps in the received clock reference stream 108 as necessary to maintain the lock while reducing timestamp processing overhead.

The clock reference stream 108 may include the audio sample timestamp 212 used for conveying the sampling time of the audio sample clock. The audio sample clock format 300 may include one or more fields used for communicating audio sample time information. For example, such fields of the audio sample clock format 300 may include, but is not limited to, an audio timestamp 302, a clock frequency 304, a clock multiplier 306, a timestamp interval 308 and a reserved section 310. The one or more fields may be configured to include an assigned length value of one or more octets. For example, the audio timestamp 302 may include, but is not limited to, comprising a length of seven octets such that it may be large enough to last for a lifetime without starting over.

The audio timestamp 302 may include a time value (e.g., 1000 ns) taken from the same clock as the data associated with the audio sample. The A/V end node 106 may receive the time value to playback (i.e., playback time) the audio sample data at the same rate. The clock frequency 304 is a nominal frequency that enables the end node device 106 to determine an initial frequency value for clock recovery at the clock recovery circuit 120. The clock frequency 304 may improve the time it may take to lock the frequency and phase of the clock reference stream 108 at the end node device 106. The clock multiplier 306 is a predefined value based on the clock frequency and is used to adjust the nominal frequency for known frequencies that are offset (e.g., enables the clock recovery circuit for backward compatibility related to frequencies represented in fraction values). The timestamp interval 308 identifies a number of audio samples between the timestamps. The timestamp interval 308 may be used to calculate the actual clock frequency value.

For example, the A/V end node 106 may receive the clock reference stream 108 comprising the audio timestamp 302 at the clock recovery circuit 120. The A/V end node 106 may calculate a first actual clock frequency based on the clock frequency 304 and clock multiplier 306. The clock frequency 304 and/or clock multiplier 306 provides the A/V end node a calculation for an initial input voltage to a circuit that generates the frequency to lock the Listener 106b-106n to the Talker 106a. The first actual clock frequency may enable the A/V end node 106 an initial frequency to improve timing of the locking of the frequency and phase of the clock reference stream 108. The A/V end node 106 may calculate the second actual clock frequency based on the timestamp interval 308 to lock the frequency and phase of the clock reference stream 108.

The audio sample clock format 300 enables the AVB network 100 to distribute a common timing grid to one or more A/V end nodes 106 that may require synchronicity in both frequency and phase with the audio media data. The audio sample clock format 300 may provide the one or more A/V end nodes 106 with the packet format 200 encoding timing points across the AVB network 100. The AVB network 100 may deliver the audio sample timestamp 212 to one or more A/V end nodes 106 operating in that clock domain via the clock reference stream 108 with multicast addressing. The multicast addressing may provide different types of codes for the media stream 110 using the clock reference stream 108 which may transmit data to bridge different types of end nodes 106. The multicast addressing may allow the one or more A/V end nodes 106 in the network 100 to receive stream packets. For example, the Listener 106b-106n in the AVB network 100 may subscribe to an address in the multicast addressing.

Figure 4A:
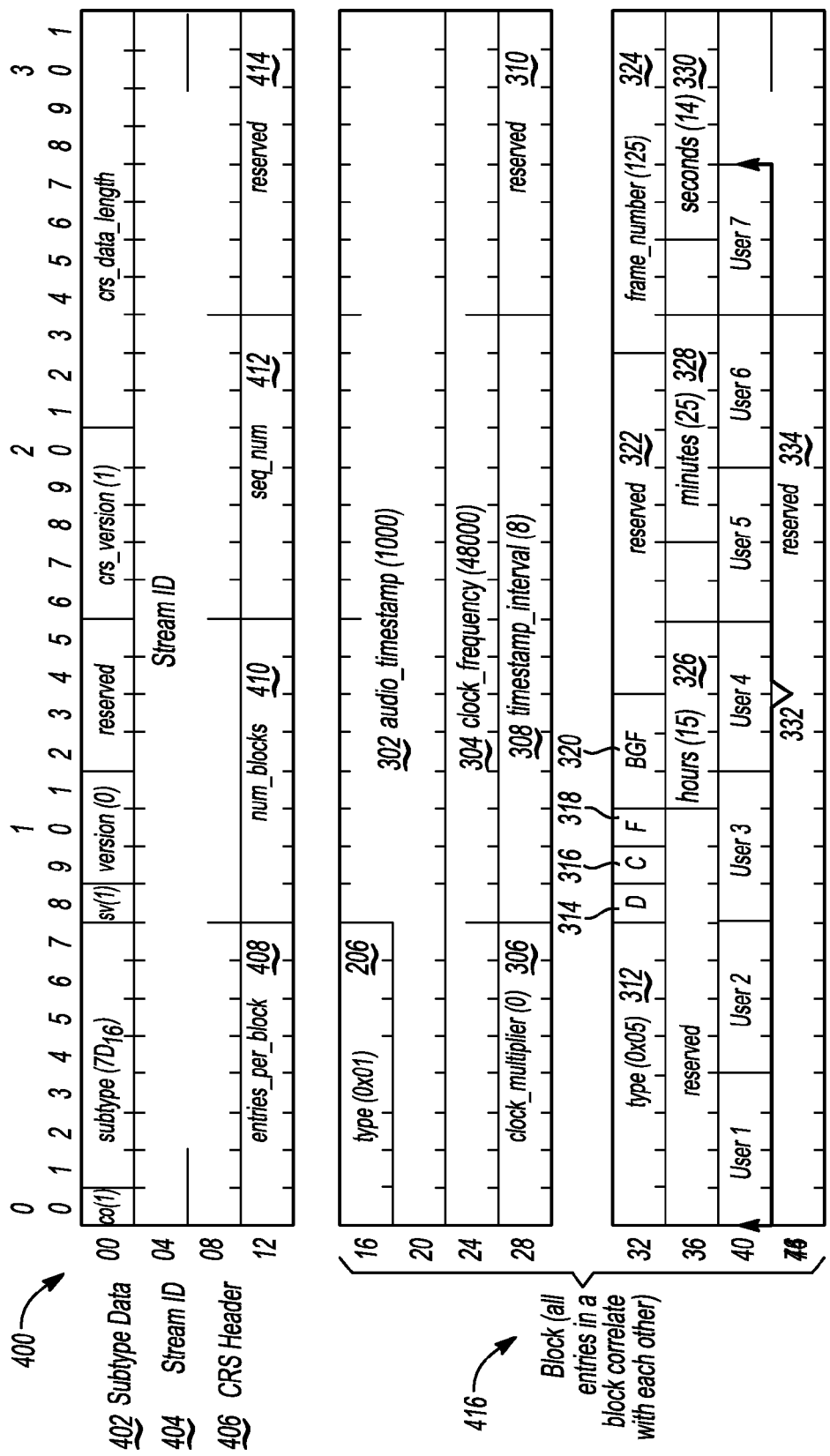
FIG. 4A-4B depict the clock reference stream including one or more information blocks being communicated to one or more audio/video end nodes in the AVB network according to an embodiment.
Figure 4B:
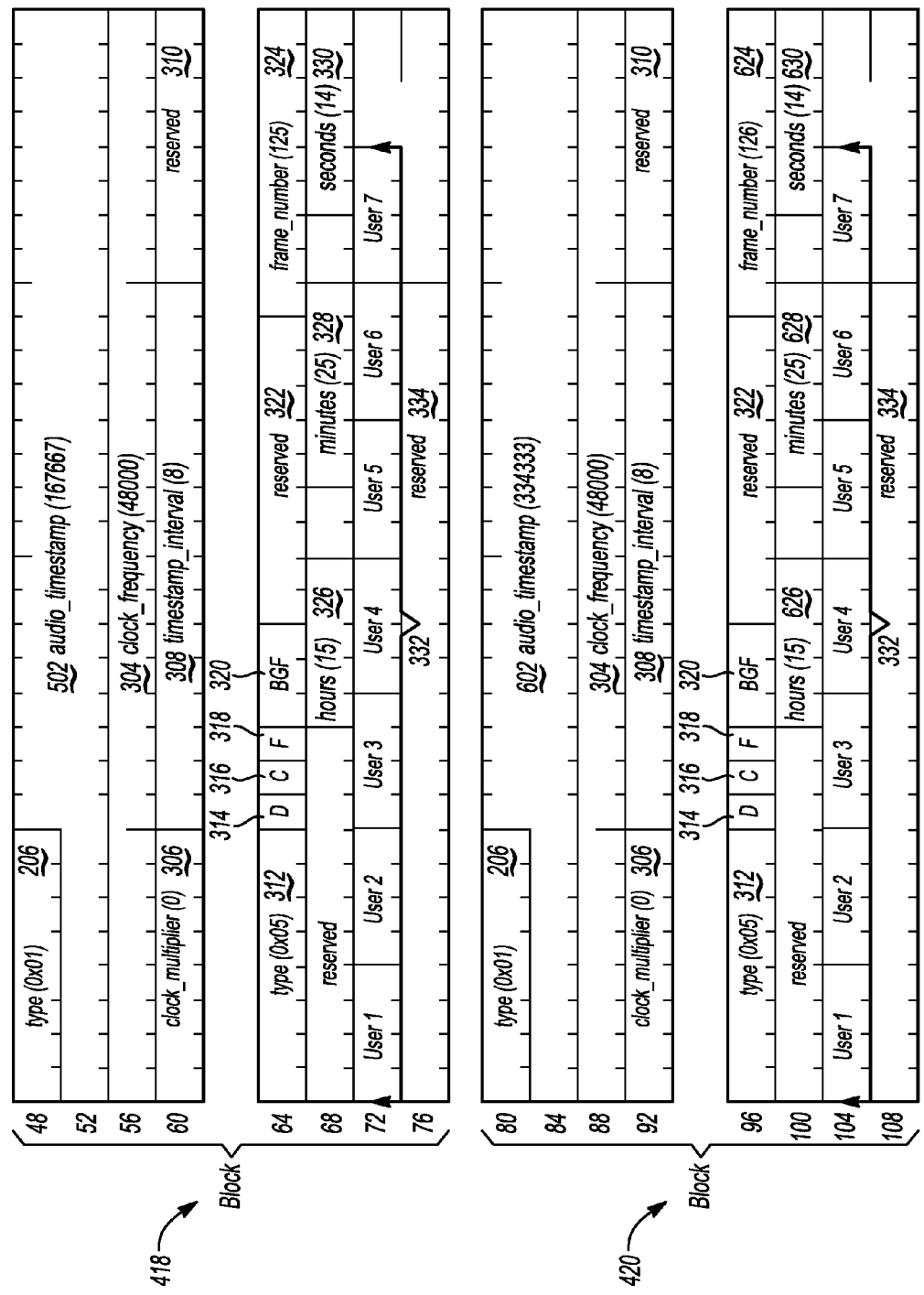

FIG. 4A-4B depict the clock reference stream 108 including one or more information blocks 400 being communicated to one or more A/V end nodes 106 in the AVB network 100 according to an embodiment. The one or more information blocks 400 are a digital data transmission that includes a timestamp such that the receiver 103 is able to synchronize to the media clock master device 105. The one more information blocks 400 may only include timing information, therefore media data is absent in the clock reference stream 108.

The one or more information blocks 400 may include an AVTP common stream header, followed by a type specific header, then one or more timestamps. The stream header may include, but is not limited to, subtype data 402, stream identification 404, and a clock reference stream header 406. The clock reference stream header 406 may include several fields including, but not limited to, entries per block 408, number of blocks 410, sequence number 412, and a reserved section 414.

The entries per block 408 is a number of timestamp, or other entries, correlated to each other temporally. For example, as shown in FIG. 4A-4B, the entries per block would be assigned the value of two since there are always two entries (audio timestamp 212 and SMPTE time code 220) in every block 416, 418, 420. The number of blocks 410 is the number of blocks present in the packet. For this example, the number of blocks 410 field may be defined as three blocks (i.e., block 416, block 418, block 420) for the clock reference stream 108 as shown in FIG. 4A-4B. The sequence number 412 allows the A/V end node 106 to determine when there is missing packets.

The one or more information blocks 400 may include, but is not limited to, one or more audio sample timestamps 212. The one or more sample timestamps 212 may be paired with the respective video frame. The one or more audio sample timestamps 212 may be communicated to at least one A/V end node 106 (e.g., video camera device) in communication with the AVB network 100.

The clock reference stream 108 includes information block 416 comprising a type field 206 of type 0x01 representing the audio sample timestamp 212. The clock reference stream 108 may provide the sampling time of the audio sample timestamp 212 to the one or more A/V end nodes 106. The audio sample timestamp 212 entry may comprise data fields that include at least one of the audio timestamp 302, the clock frequency 304, the clock multiplier 306, the timestamp interval 308, and the reserved section 310. In one example, the audio timestamp 302 may include one 64 bit timestamp. In one example, the audio sample timestamp 212 may include an initial audio timestamp 302 at 1000 ns. The clock frequency 304 may include the nominal frequency of the audio sample clock, which is set at 48,000 Hz in this example.

The clock frequencies are nominal, thus, the actual frequency of the physical media clock may differ from this value by a small amount. For example, the nominal frequency for a common audio use case is 48,000 Hz. However, the actual clock being transmitted may be 47,999 Hz based on the accuracy of a crystal or oscillator is that is generating the clock. Actual notice of the nominal frequency may be useful for clock recovery as the clock recovery circuitry 120 may adjust parameters that are optimized for certain frequency "families." This condition may allow for a quicker locking to the actual frequency.

In another example, if an audio clock is locked to a video source, the audio clock may include a pull-up or pull-down which offsets the physical clock from the nominal frequency by up to 0.1%. The one or more A/V end nodes 106 in the AVB network 100 may include recovery hardware which may adjust internal parameters to be able to handle such an offset.

The clock multiplier 306 may contain a multiplier value based on the frequency value associated with the reference type (i.e., what type of timestamp it is such as any of the Null 210, audio sample timestamp 212, video frame sync timestamp 214, the video line sync timestamp 216, audio metadata 218, the SMPTE time code 220, the SMPTE sample code 222, reserved 224, and vender specific 226) of the clock reference stream 108. For example, the audio sample clock format 300 may include the clock multiplier 306 of 1/1.001. The clock multiplier 306 may provide a way to apply a standard adjustment to a common frame or audio sample rates. For example, a 720p video scheme may not actually transmit at a frame rate of 60 Hz. The video scheme may actually transmit at (60*(1000/1001))=59.94 Hz. Therefore a value may be included in the clock multiplier 306 that indicates that the value in the clock frequency 304 is multiplied by 1000/1001.

The timestamp interval 308 may include a 16 bit field which indicates the number of samples between each timestamp given in the clock reference stream 108. For example, if the clock reference stream 108 includes a video frame sample, the timestamp interval 308 may include a 16 bit field which indicates the number of video frames between each video frame sync timestamp 214. The reserved section 310 may be set to zero on transmit and ignored when received. The reserved section 310 may be designated bits or fields which currently include no usage assigned to them. The reserved section 310 provides room to expand in future versions of the protocol, or to help align the bits of other fields so that they are more easily parsed by the receiving hardware.

The clock reference stream 108 including information block 416 may deliver timestamps every eight samples (i.e., 166,667 ns). When the audio sample is transferred to the SMPTE domain, the timestamp in information block 416 may be paired with a video comprising a set frame number 324, hour 326, minute 328, and second 330. The audio sample is formatted differently than the SMPTE defined time code, but contains all the needed information. The pairing of the SMPTE time code 220 reference type with an audio sample timestamp 212 is a way to correlate a timestamp derived from IEEE Std 802.1AS-2011.

For example, the audio sample may be paired with the SMPTE time code 220, including a type field 312 of type 0x05 representing a video. The audio sample is paired to the video at frame 125, hour 15, minute 25, and second 14. The SMPTE time code 220 may comprise additional fields including at least one of drop frame flag 314, color frame flag 316, field mark flag 318, binary group flags 320, user1-user7 fields 332, and a reserved field 334. The additional fields for the SMPTE time code 220 may enable SMPTE end nodes (i.e., devices) to communicate over the AVB network 100.

The clock reference stream 108 comprising information block 418 includes an audio timestamp 502 that is increased by 166,667 ns to 167,667 ns as expected based on the timestamps being delivered at every eight samples. Since the audio timestamp 502 is paired within the one video frame 324 (i.e., frame 125), the SMPTE time code 220 remains the same as in information block 416.

The clock reference stream 108 comprising information block 420 includes an audio timestamp 602 that is increased by 166,667 ns to 334,333 ns. The increase by 166,667 ns is as expected based on the timestamps being delivered at every eight samples. The audio timestamp 602 is paired with the video at a new frame number 624, hours 626, minutes 628, and seconds 630. The audio timestamp is paired with the SMPTE at frame 126, hour 15, minute 25, second 14.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An apparatus for communicating with a plurality of audio/video (A/V) end nodes in an Audio Video Bridging (AVB) network, the apparatus comprising:
a first A/V end node configured to:
transmit a clock reference stream including a plurality of timestamps directly to a plurality of A/V end nodes that transmit a media stream including a plurality of video samples and a plurality of audio samples to one another, the media stream being separate from the plurality of timestamps and each of the plurality of A/V end nodes being arranged to syntonize or synchronize the plurality of video samples and the plurality of audio samples with one another for playback in response to the plurality of timestamps in the clock reference stream from the first A/V end node.

2. The apparatus of claim 1 wherein one or more of the plurality of timestamps designates a playback time for the plurality of A/V end nodes.

3. The apparatus of claim 1 wherein the first A/V end node is configured to refrain from at least one of receiving media stream from the plurality of A/V end nodes and transmitting the media stream to the plurality of A/V end nodes.

4. The apparatus of claim 1 wherein each timestamp includes a reference type that defines a type of data included on the media stream as one of a first audio sample from the plurality of audio samples and a first video sample from the plurality of video samples.

5. The apparatus of claim 4 wherein each timestamp includes a clock frequency including a nominal frequency of a sample clock that enables any of the plurality of A/V end nodes to playback the plurality of samples as received on the media stream.

6. The apparatus of claim 5 wherein each timestamp includes a clock multiplier to adjust the nominal frequency of a second A/V end node that receives the media stream from the first A/V end node for providing a first actual clock frequency.

7. The apparatus of claim 6 wherein each timestamp includes a timestamp interval that determines a second actual clock frequency of the first A/V end node.

8. The apparatus of claim 1 wherein the first A/V end node is designated as a media clock master device by one of a second A/V end node or a standalone control module.

9. The apparatus of claim 1 wherein the plurality of timestamps include at least one audio timestamp, at least one video timestamp, and at least one Society of Motion Pictures and Television (SMPTE) time code.

10. The apparatus of claim 1 wherein the at least one audio timestamp is paired to at least one video timestamp or at least one SMPTE time code.

11. The apparatus of claim 1 wherein the first A/V end node includes an offset circuit configured to generate an offset to include within the clock reference stream to provide a time delay for enabling the media stream to be transmitted across the AVB network to the plurality of A/V end nodes.

12. The apparatus of claim 1 wherein the first A/V end node is further configured to transmit the clock reference stream to the plurality of A/V nodes to synchronize the playback of the plurality of video samples and the plurality of audio samples in at least one of frequency and phase in response to the plurality of timestamps.

13. The apparatus of claim 1 wherein each A/V end node of the plurality of A/V nodes includes a first input to receive the clock reference stream and a second input to receive the media stream.

14. A computer-program product embodied in a non-transitory computer readable medium that is programmed for communicating with a plurality of audio/video (A/V) end nodes in an Audio Video Bridging (AVB) network, the computer-program product comprising instructions to:
    transmit a clock reference stream including a plurality of timestamps to a plurality of A/V end nodes from a first A/V end node of the plurality of A/V end nodes; and
    transmit, from the plurality of A/V end nodes, a media stream including a plurality of video samples and a plurality of audio samples to one another, the media stream being separate from the plurality of time stamps and each of the plurality of A/V end nodes being arranged to syntonize or synchronize the plurality of video samples and the plurality of audio samples with one another for playback in response to the plurality of timestamps from the first A/V end node.

15. The computer-program product of claim 14 wherein one or more of the plurality of timestamps designates a playback time for the plurality of A/V end nodes.

16. The computer-program product of claim 14 further comprising instructions to refrain from at least one of receiving media stream from the plurality of A/V end nodes and transmitting the media stream to the plurality of A/V end nodes.

17. The computer-program product of claim 14 wherein each timestamp includes a reference type that defines a type of data included on the media stream as one of a first audio sample from the plurality of audio samples and a first video sample from the plurality of video samples.

18. The computer-program product of claim 17 wherein each timestamp includes a clock frequency including a nominal frequency of a sample clock that enables any of the plurality of A/V end nodes to playback the plurality of samples as received on the media stream.

19. The computer-program product of claim 18 wherein each timestamp includes a clock multiplier to adjust the nominal frequency of a second A/V end node that receives the media stream from a first A/V end node for providing a first actual clock frequency.

20. The computer-program product of claim 19 wherein each timestamp includes a timestamp interval that determines a second actual clock frequency of the first A/V end node.

21. The computer-program product of claim 14 wherein the plurality of timestamps include at least one audio timestamp, at least one video timestamp, and at least one Society of Motion Pictures and Television (SMPTE) time code.

22. The computer-program product of claim 14 wherein the at least one audio timestamp is paired to at least one video timestamp or the at least one SMPTE time code.

23. An apparatus for communicating with a plurality of audio/video (A/V) end nodes in an Audio Video Bridging (AVB) network, the apparatus comprising:
    a plurality of first A/V end nodes, each including a first input to receive a media stream including a plurality of video samples and a plurality of audio samples from one another and a second input to receive a clock reference stream including a plurality of timestamps from a second A/V end node, the plurality of first end nodes being configured to syntonize or synchronize the plurality of video samples and the plurality of audio samples with one another for playback in response to the plurality of timestamps from the second A/V end node.

* * * * *